(12) United States Patent
Lee et al.

(10) Patent No.: US 8,059,606 B2
(45) Date of Patent: Nov. 15, 2011

(54) METHOD FOR REPORTING CHANNEL QUALITY THROUGH UPLINK COMMON CHANNEL IN WIRELESS COMMUNICATION

(75) Inventors: Young-Dae Lee, Gyeonggi-Do (KR); Sung-Duck Chun, Gyeonggi-Do (KR); Sung-Jun Park, Gyeonggi-Do (KR); Seung-June Yi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 33 days.

(21) Appl. No.: 12/519,108

(22) PCT Filed: Jan. 8, 2008

(86) PCT No.: PCT/KR2008/000096
§ 371 (c)(1),
(2), (4) Date: Jun. 12, 2009

(87) PCT Pub. No.: WO2008/084953
PCT Pub. Date: Jul. 17, 2008

(65) Prior Publication Data
US 2010/0020712 A1    Jan. 28, 2010

Related U.S. Application Data

(60) Provisional application No. 60/884,198, filed on Jan. 9, 2007, provisional application No. 60/884,401, filed on Jan. 10, 2007.

(51) Int. Cl.
*H04W 40/12* (2009.01)
(52) U.S. Cl. ......... 370/333; 370/236; 370/332; 455/436
(58) Field of Classification Search .................. None
See application file for complete search history.

(56) References Cited

U.S. PATENT DOCUMENTS

| | | | |
|---|---|---|---|
| 6,470,391 B2 * | 10/2002 | Takamoto et al. | |
| 6,697,347 B2 * | 2/2004 | Ostman et al. | |
| 6,778,501 B1 | 8/2004 | Malmgren et al. | |
| 7,006,464 B1 * | 2/2006 | Gopalakrishnan et al. | |
| 7,158,504 B2 * | 1/2007 | Kadaba et al. | |
| 7,359,924 B2 | 4/2008 | Balachandran et al. | |
| 7,764,661 B2 * | 7/2010 | Heo et al. | 370/342 |

(Continued)

FOREIGN PATENT DOCUMENTS

EP    1432261 A1    6/2004

(Continued)

OTHER PUBLICATIONS

Rapporteur (Motorola): "Report of E-Mail Discussion: DL Scheduling", 3GPP TSG-RAN WG2, R2-063684, Dec. 12, 2006. (XP050133082).

(Continued)

*Primary Examiner* — Huy Vu
*Assistant Examiner* — Zewdu A Beyen
(74) *Attorney, Agent, or Firm* — Birch, Stewart, Kolasch & Birch, LLP

(57) ABSTRACT

In a wireless mobile communications system, a method of transmitting and receiving channel quality information is provided. A base station transmits a command or indication a terminal to transmit the channel quality information, the terminal receives the command or indication by receiving a control channel periodically, and the terminal reports the channels quality information to the base station after receiving the command or indication.

11 Claims, 2 Drawing Sheets

U.S. PATENT DOCUMENTS

| | | | |
|---|---|---|---|
| 2003/0157953 A1 | 8/2003 | Das et al. | |
| 2003/0181221 A1* | 9/2003 | Nguyen | |
| 2003/0189912 A1 | 10/2003 | Laitinen et al. | |
| 2003/0210669 A1 | 11/2003 | Vayanos et al. | |
| 2004/0081125 A1 | 4/2004 | Ranta-Aho et al. | |
| 2004/0103435 A1 | 5/2004 | Yi et al. | |
| 2004/0228294 A1 | 11/2004 | Kim et al. | |
| 2004/0266461 A1 | 12/2004 | Beckmann et al. | |
| 2006/0148411 A1* | 7/2006 | Cho et al. | |
| 2006/0152083 A1* | 7/2006 | Fuhr et al. | |
| 2006/0251105 A1* | 11/2006 | Kim et al. | |
| 2007/0047452 A1 | 3/2007 | Lohr et al. | |
| 2007/0091810 A1 | 4/2007 | Kim et al. | |
| 2007/0254679 A1* | 11/2007 | Montojo et al. | 455/458 |
| 2008/0045272 A1 | 2/2008 | Wang et al. | |
| 2008/0117891 A1 | 5/2008 | Damnjanovic et al. | |
| 2009/0028123 A1 | 1/2009 | Terry et al. | |
| 2010/0091721 A1 | 4/2010 | Larmo et al. | |

FOREIGN PATENT DOCUMENTS

| | | |
|---|---|---|
| EP | 1 724 948 A1 | 11/2006 |
| EP | 1755355 A1 * | 2/2007 |
| EP | 1843504 A2 * | 10/2007 |
| EP | 1845649 A2 * | 10/2007 |
| EP | 1845650 A2 * | 10/2007 |
| JP | 2002-527945 A | 8/2002 |
| KR | 10-2005-0109009 B1 * | 11/2005 |
| RU | 2280327 C2 | 4/2005 |
| RU | 2004 126 160 A | 1/2006 |
| RU | 2 322 765 C2 | 4/2008 |
| WO | WO 97/11566 A2 | 3/1997 |
| WO | WO 98/24250 A2 | 6/1998 |
| WO | WO-02/093296 A2 | 11/2002 |
| WO | WO-03/085874 A1 | 10/2003 |
| WO | WO 03/096149 A2 * | 11/2003 |
| WO | WO 03/096567 A1 * | 11/2003 |
| WO | WO 2005/119941 A1 | 12/2005 |
| WO | WO-2006/022876 A1 | 3/2006 |
| WO | WO-2006/105333 A1 | 10/2006 |
| WO | WO 2006/118418 A2 | 11/2006 |

OTHER PUBLICATIONS

Ericsson" Uplink HARQ-ARQ Interactions for NACK→ACK error", 3GPP TSG-RAN WG2, R2-063238, Nov. 6-10, 2006. (XP050132733).

Nokia: "ARQ Operation with HARQ-ARQ interaction", 3GPP TSQ-RAN WG2, R2-062765, Oct. 9-13, 2006. (XP003012349).

Sharp: "UE Identity in L1/L2 Control Signalling for Downlink Scheduling Resource Allocation", 3GPP TSG-RAN WG2, R2-061129, May 8-12, 2006. (XP050131084).

Samsung: "MAC functions: ARQ", 3GPP TSG-RAN2, R2-060374, Feb. 13-17, 2006. (XP002488423).

Texas Instruments: "Control Channel Structure and Coding in E-UTRA Downlink", 3GPP TSG RAN WG1, R1-063220, Nov. 6-10, 2006. (XP050103675).

LG Electronics: "Downlink control signaling", 3GPP TSG RAN WG1, R1-063177, Nov. 6-10, 2006. (XP050103632).

Samsung: "DL control channel structure: overview", 3GPP TSG RAN WG1, R1-062534, Oct. 9-13, 2006.

Ericsson: "E-UTRA Downlink Control Signaling-Open Issues", TSG-RAN WG1, R1-061365, May 8-12, 2006. (XP050102238).

Hermann, C. et al., "Improving Packet Loss Probability in the UMTS High-Speed Downlink", Philips Research Laboratories, pp. 2655-2659, 2003. (XP010701537).

"Universal Mobile Telecommunications System (UMTS); High Sped Downlink Packet Access (HSDPA); Overall description; Stage 2 (3GPP TS 25.308 version 7.1.0 Release 7); ETSI TS 125 308" ETSI Standards, vol. 3-R2, No. V7.1.0, Dec. 1, 2006 XP014039997.

"Universal Mobile Telecommunications System (UMTS); User Equipment (UE) procedures in idle mode and procedures for cell reselection in connected mode (3GPP TS 25.304 version 7.1.0 Release 7); ETSI TS 125 304" ETSI Standards, vol. 3-R2, No. V7.1.0, Dec. 1, 2006 XP014039981.

An English abstract is provided for RU-2004132193-A.

* cited by examiner

[Fig. 1]
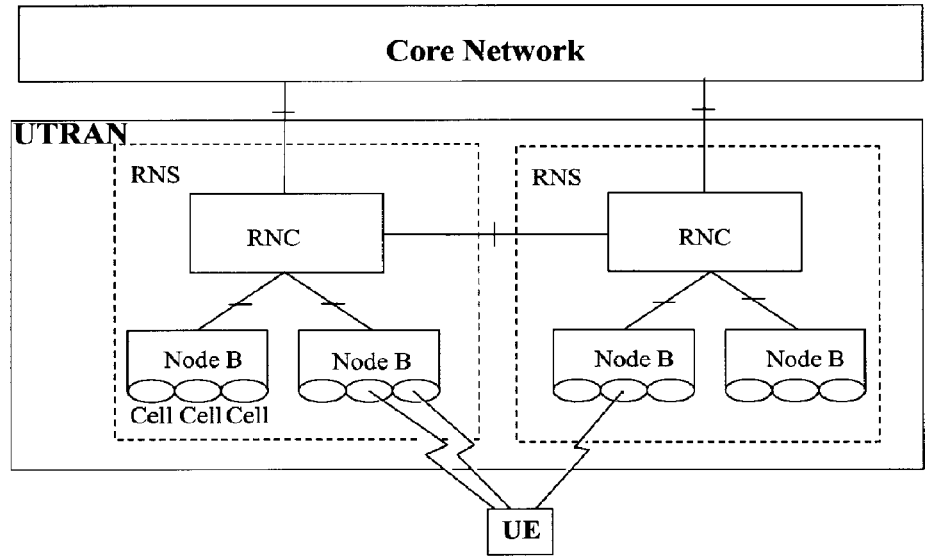
[Fig. 2]
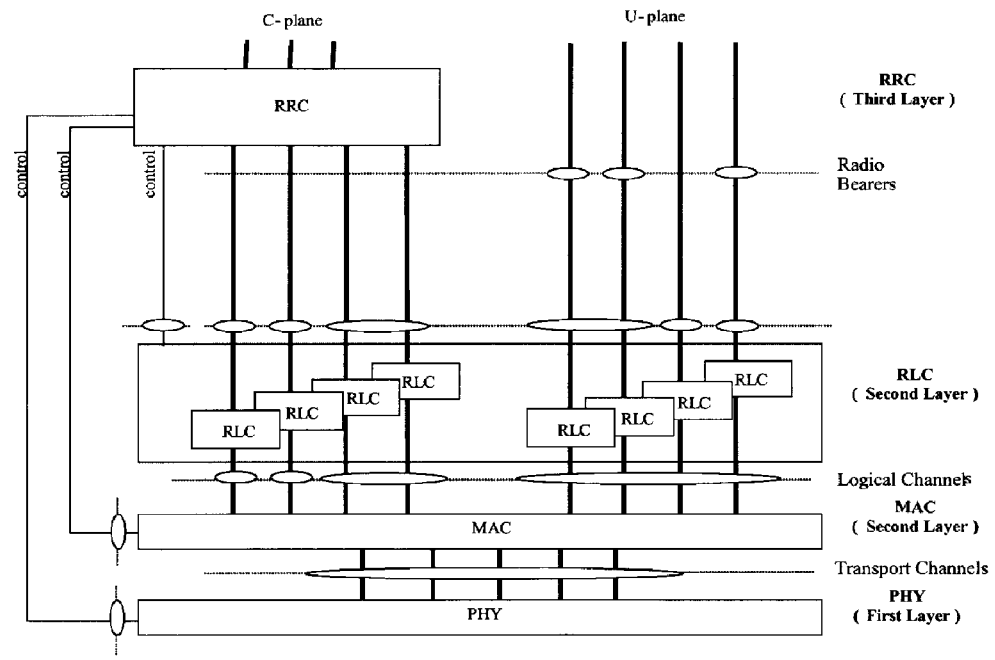
[Fig. 3]
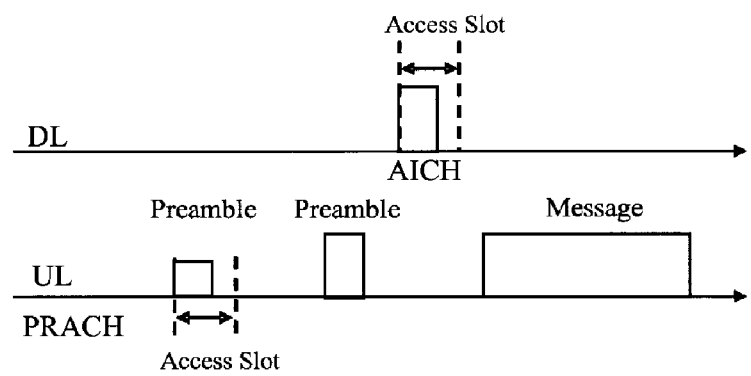

[Fig. 4]
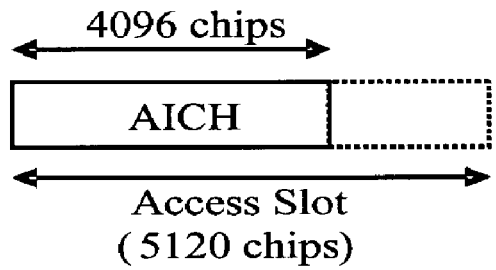
[Fig. 5]
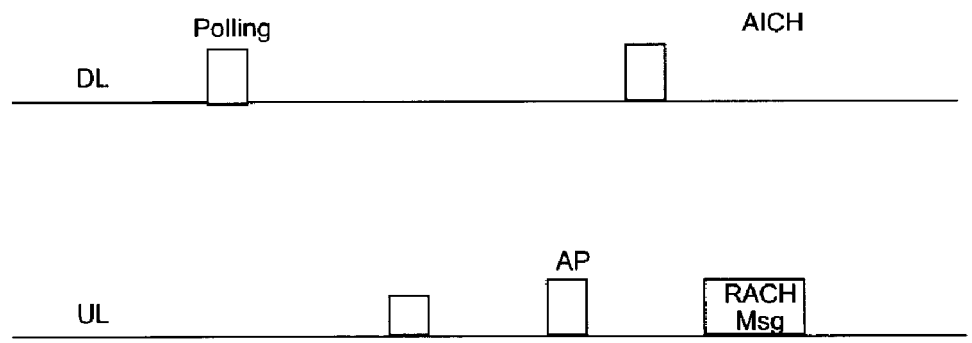
[Fig. 6]
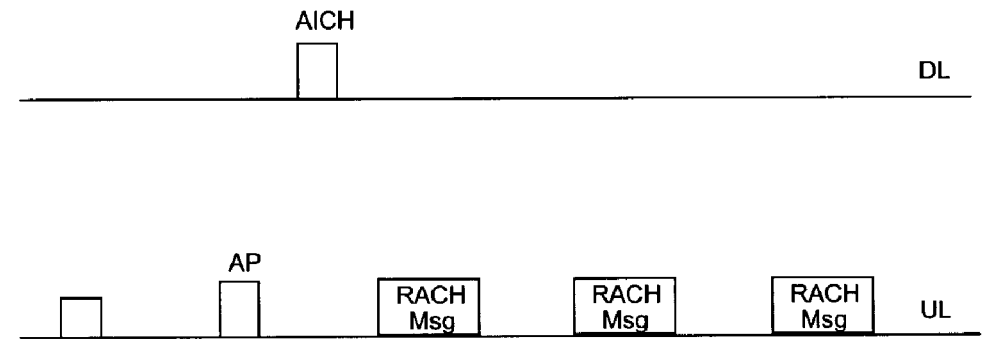
[Fig. 7]
[Fig. 8]
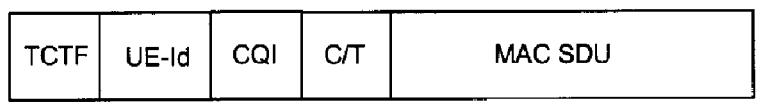
[Fig. 9]
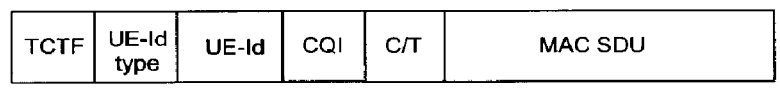

METHOD FOR REPORTING CHANNEL QUALITY THROUGH UPLINK COMMON CHANNEL IN WIRELESS COMMUNICATION

This application is the National Phase of PCT/KR2008/000096 filed on Jan. 8, 2008, which claims priority under 35 U.S.C. 119(e) to U.S. Provisional Application Nos. 60/884,198, filed on Jan. 9, 2007, and 60/884,401 filed on Jan. 10, 2007, all of which are hereby expressly incorporated by reference into the present application.

DISCLOSURE OF INVENTION

Technical Solution

The present invention relates to a mobile terminal that transmits data or signals using an uplink channel, and more particularly, a network (i.e., base station) transmits a command to the mobile terminal for receiving channel quality information, the mobile terminal receives the command by receiving a control channel periodically, the mobile terminal temporarily reports the channel quality information to the network after receiving the command from the network.

The universal mobile telecommunications system (UMTS) is a third-generation mobile communications system evolving from the global system for mobile communications system (GSM), which is the European standard. The UMTS is aimed at providing enhanced mobile communications services based on the GSM core network and wideband code-division multiple-access (W-CDMA) technologies.

FIG. 1 shows an exemplary diagram illustrating an Universal Mobile Telecommunication System (UMTS) network of a conventional mobile communication system. The UMTS is comprised of, largely, a user equipment (UE) or a mobile terminal (referred to a terminal hereafter), a UMTS Terrestrial Radio Access Network (UTRAN), and a core network (CN). The UTRAN comprises at least one Radio Network Sub-system (RNS), and each RNS is comprised of one Radio Network Controller (RNC) and at least one base station (Node B) which is controlled by the RNC. For each Node B, there is at least one cell.

FIG. 2 is an exemplary diagram illustrating a structure of a Radio Interface Protocol (RIP) between a UE and the UTRAN. Here, the UE is associated with a 3rd Generation Partnership Project (3GPP) wireless access network standard. The structure of the RIP is comprised of a physical layer, a data link layer, and a network layer on the horizontal layers. On the vertical plane, the structure of the RIP is comprised of a user plane, which is used for transmitting data, and a control plane, which is used for transmitting control signals. The protocol layers of FIG. 2 can be categorized as L1 (first layer), L2 (second layer), and L3 (third layer) based on an Open System Interconnection (OSI) model. Each layer will be described in more detail as follows.

The first layer (L1), namely, the physical layer, provides an upper layer with an information transfer service using a physical channel. The physical layer is connected to an upper layer called a medium access control (MAC) layer through a transport channel. Data is transferred between the MAC layer and the physical layer through the transport channel. Data is also transferred between different physical layers, i.e. between physical layers of a transmitting side and a receiving side, through the physical channel.

The MAC layer of the second layer (L2) provides an upper layer called a radio link control (RLC) layer with a service through a logical channel. The RLC layer of the second layer supports reliable data transfer and performs segmentation and concatenation of a service data unit (SDU) received from an upper layer.

A radio resource control (RRC) layer at a lower portion of the L3 layer is defined in the control plane and controls logical channels, transport channels, and physical channels for configuration, re-configuration and release of radio bearers (RBs). A RB is a service provided by the second layer for data transfer between the terminal and the UTRAN. The configuration of the RBs includes defining characteristics of protocol layers and channels required to provide a specific service, and configuring respective specific parameters and operation methods.

A Random Access Channel of a WCDMA will be described in more detail as follows.

The Random Access Channel (RACH) is used to transfer a short length data on an uplink, and some of the RRC message (i.e., RRC Connection Request Message, Cell Update Message, URA Update Message) is transmitted via the RACH. The RACH is mapped to a Common Control Channel (CCCH), a Dedicated Control Channel (DCCH) and a Dedicated Traffic Channel (DTCH), and then the RACH is mapped to a Physical Random Access Channel (PRACH).

FIG. 3 shows how the physical random access channel (PRACH) power ramping and message transmission may be performed.

Referring to FIG. 3, the PRACH, which is an uplink physical channel, is divided into a preamble part and a message part. The preamble part is used to properly control a transmission power for a message transmission (i.e., a power ramping function] and is used to avoid a collision between multiple terminals. The message part is used to transmit a MAC PDU that was transferred from the MAC to the Physical channel.

When the MAC of the terminal instructs a PRACH transmission to the physical layer of the terminal, the physical layer of the terminal first selects one access slot and one (preamble) signature, and transmits the preamble on the PRACH to an uplink. Here, the preamble is transmitted within a particular the length of access slot duration (e.g., 1.33 ms). One signature is selected among the 16 different signatures within a first certain length of the access slot, and it is transmitted.

If the preamble is transmitted from the terminal, a base station transmits a response signal via an Acquisition indicator channel (AICH) which is a downlink physical channel. The AICH, in response to the preamble, transmits a signature that was selected within the first certain length of the access slot. Here, the base station transmits an ACK response or a NACK response to the terminal by means of the transmitted signature from the AICH.

If the ACK response is received, the terminal transmits a 10 ms or 20 ms length of the message part using an OVSF code that correspond with the transmitted signature. If the NACK response is received, the MAC of the terminal instructs the PRACH transmission again to the physical layer of the terminal after a certain time period. Also, if no AICH is received with respect to the transmitted preamble, the terminal transmits a new preamble with a higher power compared to that used for the previous preamble after a predetermined access slot.

FIG. 4 illustrates an exemplary structure of an Acquisition Indicator Channel (AICH).

As shown in FIG. 4, the AICH, which is a downlink physical channel, transmits 16 symbol signatures (Si, i=0, . . . , 15) for the access slot having a length of 5120 chips. The terminal may select any arbitrary signature (Si) from S0 signature to S15 signature, and then transmits the selected signature during the first 4096 chips length. The remaining 1024 chips length is set as a transmission power off period during which no symbol is transmitted. Also, as similar to FIG. 5, the preamble part of the uplink PRACH transmits 16 symbol signatures (Si, i=0, . . . , 15) during the first 4096 chips length.

In the related art, a terminal transmits channel quality information to a base station only using a terminal dedicated channel in CELL_DCH state of RRC, and the base station can control a MCS (Modulation and Coding Scheme) of downlink HS-DSCH (High-Speed Downlink Shared Channel) using the received channel quality information. However, it is impossible to establish the terminal dedicated channel except for the CELL_DCH state of RRC such that the terminal can not possibly transmit the channel quality information elsewhere. Due to this circumstance, the base station can not dynamically control the MCS of downlink HS-DSCH for a corresponding terminal, thereby causing great drawbacks of performing a HSDPA (High-Speed Downlink Packet Access) transmission ineffectively.

The present invention has been developed in order to solve the above described problems of the related art. As a result, the present invention provides a method for optimizing a radio transmission by a network (i.e., base station) for transmitting a command to a terminal in order to receive channel quality information, the terminal checks a reception of such command periodically, the terminal temporarily reports the channel quality information to the network when such command is received from the network.

To implement at least the above feature in whole or in parts, the present invention may provide a method of transmitting channel quality information (CQI) in a mobile communications system, the method comprising: periodically checking whether a request for reporting the channel quality information is received from a network, wherein the request is transmitted from the network for a report of channel quality; and transmitting the channel quality information to the network after the request is received according to the checking step. The present invention may provide a method of receiving channel quality information (CQI) in a mobile communications system, the method comprising: transmitting, to a mobile terminal, a request for reporting the channel quality information when the channel quality information is temporarily needed; and receiving the channel quality information from the mobile terminal. Also, the present invention may provide a mobile terminal for transmitting channel quality information (CQI), the mobile terminal comprising: a radio protocol adapted to periodically check whether a request for reporting the channel quality information is received from a network, wherein the request is transmitted from the network for a report of channel quality, and to transmit the channel quality information to the network after the request is received.

Additional features of this disclosure will be set forth in part in the description which follows and in part will become apparent to those having ordinary skill in the art upon examination of the following or may be learned from practice of this disclosure. The objectives and other advantages of this disclosure may be realized and attained by the structure particularly pointed out in the written description and claims hereof as well as the appended drawings.

The accompanying drawings, which are included to provide a further understanding of this disclosure and are incorporated in and constitute a part of this specification, illustrate embodiments of this disclosure and together with the description serve to explain the principles of this disclosure.

In the drawings:

FIG. 1 shows an exemplary diagram illustrating an Universal Mobile Telecommunication System (UMTS) network of a conventional mobile communication system.

FIG. 2 shows an exemplary diagram illustrating a structure of a Radio Interface Protocol (RIP) between a UE and the UTRAN.

FIG. 3 shows how the physical random access channel (PRACH) power ramping and message transmission may be performed.

FIG. 4 illustrates an exemplary structure of an Acquisition Indicator Channel (AICH).

FIG. 5 shows an exemplary diagram for transmitting and receiving channel quality information according to one embodiment of the present invention.

FIG. 6 shows an exemplary diagram for transmitting and receiving channel quality information according to another embodiment of the present invention.

FIGS. 7, 8 and 9 show an exemplary MAC PDU formats according to an exemplary embodiment of the present invention.

Reference will now be made in detail to the preferred embodiments of this disclosure, examples of which are illustrated in the accompanying drawings.

One aspect of the present invention is the recognition by the present inventors regarding the problems and drawbacks of the related art described above and explained in more detail hereafter. Based upon such recognition, the features of the present invention have been developed.

Although this disclosure is shown to be implemented in a mobile communication system, such as a UMTS developed under 3GPP specifications, this disclosure may also be applied to other communication systems operating in conformity with different standards and specifications.

FIG. 5 shows an exemplary diagram for transmitting and receiving channel quality information according to one embodiment of the present invention.

A base station may command a terminal to transmit channel quality information (CQI) through HS-SCCH channel. Also, the base station may command a terminal to transmit channel quality information by transmitting a MAC PDU through a high-speed downlink channel such as HS-DSCH channel.

When the base station indicates (or instructs) the terminal to report the channel quality information through the HS-SCCH channel, the base station may transmit a identifier (i.e., H-RNTI) of a corresponding terminal along with a command that indicates the corresponding terminal to report the channel quality information to the base station. Here, the identifier and command may transmit through the HS-SCCH channel. After the terminal receives the identifier corresponding to its own terminal's identification and the command via the HS-SCCH channel, the corresponding terminal may transmit the channel quality information to the base station.

If the base station instructs the terminal to report the channel quality information through the MAC PDU, the base station may include a command that instructs to report the channel quality information within the MAC PDU transmitted to the corresponding terminal. When the terminal receives such command through the MAC PDU, the terminal may transmit the channel quality information to a corresponding base station.

When the terminal transmits the channel quality information to the corresponding base station, the terminal may perform an uplink transmission of the channel quality information according to the received command or instruction from the base station. If the base station fails to receive the channel quality information from the corresponding terminal for a certain time period after transmitting such command or instruction, the base station may again command or instruction the corresponding terminal to transmit the channel quality information. The command or instruction may repeatedly transmit to the corresponding terminal until the channel quality information is successfully received.

Also, the terminal may transmit the channel quality information to the corresponding base station using a random access or random access channel (RACH). As illustrated in FIG. 6, when the terminal transmits the channel quality information through the random access or random access channel, the terminal may transmit a RACH message including the channel quality information. The RACH message may be repeatedly transmitted several times to the corresponding base station in order to increase a reliability (certainty) of reporting the channel quality information. In case that the RACH message is repeatedly transmitted several times, a second RACH message or after the second RACH message that includes same channel quality information may be transmitted without performing a power ramping procedure. As shown in FIG. 6, a transmission power of first RACH message may set equal to a transmission power of the second or third RACH message. Also, the transmission power of each RACH message may set differently. In related art, the RACH message may be transmitted in 10 ms or 20 ms TTI (Transmission Time Interval). However, in order to support a high speed packet access technique (i.e., HSDPA (High-Speed Downlink Packet Access), HSUPA (High-Speed Uplink Packet Access), etc) the RACH message according to the present invention may be transmitted in 2 ms TTI.

FIGS. 7, 8 and 9 show exemplary MAC PDU formats according to an exemplary embodiment of the present invention.

The present invention may propose to use an indication or instruction for indicating channel quality information of a corresponding MAC PDU is included in a particular field of the corresponding MAC PDU. For example, the particular filed of the MAC PDU may be a TCTF (Type Channel Type Field), which used to indicate a type of logical channel related to the corresponding MAC PDU in related art. The table 1 shows an exemplary format or structure of TCTF coding. According to the present invention, with reference to the table 1, a corresponding MAC PDU is indicated to include channel quality information when the corresponding MAC PDU has a TCTF code value equal to 10.

TABLE 1

| TCTF | Designation |
| --- | --- |
| 00 | CCCH |
| 01 | DCCH or DTCH over RACH |
| 10 | DCCH or DTCH over RACH with CQI |
| 11 | Reserved (PDUs with this coding will be discarded by this version of the protocol) |

As illustrated in FIGS. 7, 8, and 9, a format of the MAC PDU may be structured differently. Here, in order to identify which particular terminal measures channel quality information, a field for terminal's identifier or identification (i.e., UE ID) is also included in the MAC PDU as well as a field for the channel quality information (CQI). The UE ID field of the MAC PDU may be occupied with a C-RNTI (Cell Radio Network Temporary Identifier), a H-RNTI (HS-DSCH Radio Network Temporary Identifier), a E-RNTI (E-DCH Radio Network Temporary Identifier), etc. Further, as shown in FIG. 9, a field of UE ID type may be included in the MAC PDU in order to indicate a type of terminal's identifier or identification.

When the terminal performs an uplink transmission of channel quality information included in the MAC PDU, an exemplary MAC PDU format shown in FIG. 7 may be used if there is no data (i.e., payload) to be transmitted to an uplink, and an exemplary MAC PDU format shown in FIG. 8 may be used if there is data to be transmitted to the uplink.

The terminal may transmit the MAC PDU of the RACH message in every 2 ms TTI (Transmission Time Interval). Here, a preamble of the RACH message may indicate what TTI (i.e., 2 ms, 10 ms, 20 ms, etc) is being used to transmit the RACH message.

It can be said that the present invention provides a method of transmitting channel quality information (CQI) in a mobile communications system, the method comprising: periodically checking whether a request for reporting the channel quality information is received from a network, wherein the request is transmitted from the network for a report of channel quality; and transmitting the channel quality information to the network after the request is received according to the checking step, wherein the periodically checking step is performed by monitoring a control channel, the monitoring of the control channel is performed by periodically receiving the control channel, the channel quality information is transmitted through a random access channel (RACH), the channel quality information is included a medium access control protocol data unit (MAC PDU) of a RACH message, at least one RACH message is transmitted after the request is received, the channel quality information is transmitted periodically for certain time period after the request is received, the request is transmitted from the network through first layer signaling via a physical control channel, and the request is included in a header or payload of a MAC PDU generated in a MAC layer.

Also, the present invention may provide a method of A method of receiving channel quality information (CQI) in a mobile communications system, the method comprising: transmitting, to a mobile terminal, a request for reporting the channel quality information when the channel quality information is temporarily needed; and receiving the channel quality information from the mobile terminal, wherein the received channel quality information is used to support high speed packet access procedures, the channel quality information is received through a random access channel (RACH), the channel quality information is transmitted periodically for certain time period, and the request is included in a header or payload of a MAC PDU generated in a MAC layer.

Also, the present invention may provide a mobile terminal for transmitting channel quality information (CQI), the mobile terminal comprising: a radio protocol adapted to periodically check whether a request for reporting the channel quality information is received from a network, wherein the request is transmitted from the network for a report of channel quality, and to transmit the channel quality information to the network after the request is received.

Although the present invention is described in the context of mobile communications, the present invention may also be used in any wireless communication systems using mobile devices, such as PDAs and laptop computers equipped with wireless communication capabilities (i.e. interface). Moreover, the use of certain terms to describe the present invention should not limit the scope of the present invention to a certain type of wireless communication system. The present invention is also applicable to other wireless communication systems using different air interfaces and/or physical layers, for example, TDMA, CDMA, FDMA, WCDMA, OFDM, EV-DO, Mobile Wi-Max, Wi-Bro, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

This specification describes various illustrative embodiments of the present invention. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the invention disclosed herein.

The invention claimed is:

1. A method of transmitting channel quality information (CQI) in a mobile communications system, the method comprising:
   periodically checking whether a request for reporting the channel quality information is received from a network,
   wherein the request is transmitted from the network for a report of channel quality
   wherein the request is received through a High Speed-Shared Control Channel (HS-SCCH),
   wherein an identifier of a corresponding terminal is also received from the network through the HS-SCCH, and
   wherein the identifier of the corresponding terminal is a HS-DSCH Radio Network Temporary Identifier (H-RNTI); and
   transmitting the channel quality information to the network after the request is received according to the checking step,
   wherein the channel quality information is transmitted to the network through a random access channel (RACH) procedure,
   wherein the channel quality information is included in a medium access control protocol data unit (MAC PDU) of a RACH message,
   wherein the MAC PDU including the CQI is transmitted to the network through a High Speed-Downlink Shared Channel (HS-DSCH),
   wherein a format of the MAC PDU transmitted through the HS-DSCH is determined by the H-RNTI received through the HS-SCCH, and
   wherein the RACH message is transmitted in a transmission time interval (TTI) of every 2 ms
   wherein the MAC PDU comprises: a TCTF (Type Channel Type Field) which used to indicate a type of logical channel; a terminal ID to identify a channel quality measurement terminal; and an indicator in a preamble of the MAC PDU to indicate the RACH message is transmitted in the transmission time interval (TTI) of every 2 ms.

2. The method of claim 1, wherein the periodically checking step is performed by monitoring a control channel.

3. The method of claim 2, wherein the monitoring of the control channel is performed by periodically receiving the control channel.

4. The method of claim 1, wherein at least one RACH message is transmitted after the request is received.

5. The method of claim 1, wherein the channel quality information is transmitted periodically for certain time period after the request is received.

6. The method of claim 1, wherein the request is transmitted from the network through first layer signaling via a physical control channel.

7. The method of claim 1, wherein the request is included in a header or payload of a MAC PDU generated in a MAC layer.

8. A method of receiving channel quality information (CQI) in a mobile communications system, the method comprising:
   transmitting, to a mobile terminal, a request for reporting the channel quality information when the channel quality information is temporarily needed:
   wherein the request is transmitted through a High Speed-Shared Control Channel (HS-SCCH),
   wherein an identifier of a corresponding terminal is also transmitted to the mobile terminal through the HS-SCCH, and
   wherein the identifier of the corresponding terminal is a HS-DSCH Radio Network Temporary Identifier (H-RNTI); and
   receiving the channel quality information from the mobile terminal,
   wherein the channel quality information is received from the mobile terminal through a random access channel (RACH) procedure,
   wherein the channel quality information is included in a medium access control protocol data unit (MAC PDU) of a RACH message,
   wherein the MAC PDU including the CQI is received from the mobile terminal through a High Speed-Downlink Shared Channel (HS-DSCH),
   wherein a format of the MAC PDU received through the HS-DSCH is determined by the H-RNTI transmitted through the HS-SCCH, and
   wherein the RACH message is received in a transmission time interval (TTI) of every 2 ms
   wherein the MAC PDU comprises: a TCTF (Type Channel Type Field) which used to indicate a type of logical channel;
   a terminal ID to identify a channel quality measurement terminal; and an indicator in a preamble of the MAC PDU to indicate the RACH message is transmitted in the transmission time interval (TTI) of every 2 ms.

9. The method of claim 8, wherein the received channel quality information is used to support high speed packet access procedures.

10. The method of claim 8, wherein the request is included in a header or payload of a MAC PDU generated in a MAC layer.

11. A mobile terminal for transmitting channel quality information (CQI), the mobile terminal comprising:

a radio protocol adapted to periodically check whether a request for reporting the channel quality information is received from a network, wherein the request is received through a High Speed-Shared Control Channel (HS-SCCH), wherein an identifier of a corresponding terminal is also received from the network through the HS-SCCH, wherein the identifier of the corresponding terminal is a HS-DSCH Radio Network Temporary Identifier (H-RNTI)

wherein the request is transmitted from the network for a report of channel quality, and to transmit the channel quality information to the network after the request is received, wherein the channel quality information is transmitted to the network through a random access channel (RACH) procedure, wherein the channel quality information is included in a medium access control protocol data unit (MAC PDU) of a RACH message, wherein the MAC PDU including the CQI is transmitted to the network through a High Speed-Downlink Shared Channel (HS-DSCH), wherein a format of the MAC PDU transmitted through the HS-DSCH is determined by the H-RNTI received through the HS-SCCH, and wherein the RACH message is transmitted in a transmission time interval (TTI) of every 2 ms wherein the MAC PDU comprises: a TCTF (Type Channel Type Field) which used to indicate a type of logical channel; a terminal ID to identify a channel quality measurement terminal; and an indicator in a preamble of the MAC PDU to indicate the RACH message is transmitted in the transmission time interval (TTI) of every 2 ms.

\* \* \* \* \*